(12) United States Patent
Honma et al.

(10) Patent No.: US 9,308,956 B2
(45) Date of Patent: Apr. 12, 2016

(54) SEAT FOR TWO-WHEELED VEHICLE

(71) Applicant: TS TECH CO., LTD., Asaka-shi, Saitama (JP)

(72) Inventors: Yuichi Honma, Tochigi (JP); Hiroshi Yogo, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 18 days.

(21) Appl. No.: 14/360,123

(22) PCT Filed: Nov. 27, 2012

(86) PCT No.: PCT/JP2012/080554
§ 371 (c)(1),
(2) Date: May 22, 2014

(87) PCT Pub. No.: WO2013/080945
PCT Pub. Date: Jun. 6, 2013

(65) Prior Publication Data
US 2014/0327280 A1    Nov. 6, 2014

(30) Foreign Application Priority Data

Nov. 28, 2011    (JP) ................................ 2011-259059

(51) Int. Cl.
| | |
|---|---|
| *B62J 1/00* | (2006.01) |
| *B62J 1/28* | (2006.01) |
| *B62J 1/12* | (2006.01) |
| *B62J 1/26* | (2006.01) |

(52) U.S. Cl.
CPC .. *B62J 1/00* (2013.01); *B62J 1/007* (2013.01); *B62J 1/12* (2013.01); *B62J 1/26* (2013.01); *B62J 1/28* (2013.01)

(58) Field of Classification Search
CPC ................ B62J 1/00; B62J 1/007; B62J 1/10; B62J 1/28; B62J 1/12; B62J 1/26
See application file for complete search history.

(56) References Cited

U.S. PATENT DOCUMENTS

| | | | | |
|---|---|---|---|---|
| 5,634,685 A | * | 6/1997 | Herring | 297/219.11 |
| 5,658,050 A | * | 8/1997 | Lorbiecki | 297/452.41 |
| 6,012,772 A | * | 1/2000 | Conde et al. | 297/219.11 |

FOREIGN PATENT DOCUMENTS

| | | |
|---|---|---|
| JP | 56-87386 U | 7/1981 |
| JP | 61-3180 U | 1/1986 |
| JP | 61-105281 U | 7/1986 |

(Continued)

OTHER PUBLICATIONS

Office Action issued for JP 2011-259059 (Jun. 30, 2015).

*Primary Examiner* — Philip Gabler
(74) *Attorney, Agent, or Firm* — Drinker Biddle & Reath LLP (57) ABSTRACT

Provided is a seat for a two-wheeled vehicle provided with a lumbar support portion which can be constructed to not deform rearward without a support element such as a plate and a bottom panel, can produce a sufficient sense of fit adapted to a physique, is lightweight, and is simple in configuration. The seat for a two-wheeled vehicle is provided with the lumbar support portion. The lumbar support portion is formed into an arc shape having both sides protruding forward. The lumbar support portion includes an internal padding material formed continuously, and bulging portions having surface sides of both side regions including both sides of the lumbar support portion bulging forward of the vehicle are formed on both side regions.

9 Claims, 11 Drawing Sheets

(56) References Cited

FOREIGN PATENT DOCUMENTS

| JP | 61-109884 U | 7/1986 |
| JP | 62-244768 A | 10/1987 |
| JP | 62-244773 A | 10/1987 |
| JP | 02-296584 A | 12/1990 |
| JP | 2005-125860 A | 5/2005 |
| JP | 2007-118877 A | 5/2007 |

* cited by examiner

FIG. 11

SEAT FOR TWO-WHEELED VEHICLE

CROSS REFERENCE TO RELATED APPLICATIONS

This application is the U.S. national phase of the International Patent Application No. PCT/JP2012/080554, filed Nov. 27, 2012, which claims the benefit of Japanese Patent Application No. 2011-259059, filed Nov. 28, 2011, the entire content being incorporated herein by reference.

BACKGROUND

Disclosed herein is a seat for a two-wheeled vehicle, and more particularly, a seat for a two-wheeled vehicle provided with a lumbar support portion. The seat for a two-wheeled vehicle herein includes a single seat and a tandem seat, and the two-wheeled vehicle includes a motor bicycle, a motor tricycle, a scooter, a jet ski, and a snowmobile and the like.

There is generally known such a technology for a seat for a two-wheeled vehicle that changes a seating posture of an occupant, changes a pressed portion of the body of the occupant, thereby reducing fatigue, or changes a seat surface or a support state for the lumbar depending on a riding state (refer to Japanese Patent Application Laid-Open No. 2005-125860 ("the '860 application")).

The '860 application discloses a technology of adjusting a position of a backrest in a front to back direction, and activating side supports in an open/close direction by using operation means based on a drive signal.

A technology according to Japanese Utility Model Application Laid-Open No. S61-105281 ("the '281 application") is an example where a skin material itself is configured as a construction member of an air chamber via a cushion material on a bottom plate, and is a technology of partitioning the air chamber to be arranged on a front surface side of a seatback.

A technology according to Japanese Utility Model Application Laid-Open No. S61-3180 ("the '180 application") uses a bottom panel, and is a technology of using a soft porous body between airbags in order to prevent a feel of discomfort on the back due to charge and discharge of the air.

The technology according to the '860 application has such a configuration that supports a cushion material by using a plate, and uses mechanical means for moving. Therefore, it is inconveniently complex.

The technology according to the '281 application constructs the seatback by using the bottom plate, and the airbag is constructed in the divided form on the front surface side of the seatback within a range of the width of the seatback. The bottom plate is used in this way, and it is inconvenient because it is hard for the airbag to sufficiently provide a support adapted to a physique of an occupant or the like.

The technology according to the '180 application uses the bottom panel, and the airbag is arranged at the back and the like of the occupant. This is inconvenient because the charge and the discharge of the air generate a sense of discomfort, and it is hard for the airbag to sufficiently provide a support adapted to a physique of an occupant or the like.

It is therefore an object of the disclosure herein to provide a seat for a two-wheeled vehicle provided with a lumbar support portion which can be constructed to not deform rearward without a support such as a plate and a bottom panel, and can produce a sufficient sense of fit adapted to a physique, and which is lightweight, and simple in configuration.

The above-noted problems can be solved by a seat for a two-wheeled vehicle that includes a lumbar support portion, where the lumbar support portion is formed into an arc shape having both side portions protruding forward, the lumbar support portion including an internal padding material formed continuously, and bulging portions having surface sides of both side regions including both sides of the lumbar support portion bulging forward of the vehicle are formed on both side regions.

The lumbar support portion is formed into the arc shape having both side portions protruding forward, and includes the internal padding material formed continuously, and can thus reduce a rearward deformation. Moreover, the surface sides of both side regions bulge forward of the vehicle, the surface sides directly bulge compared with a case where a bulging portion is formed in the padding material, thereby directly supporting the occupant, and can thus produce the sufficient sense of fit adapted to the physique. Moreover, the bulging portions are constructed on the surface side, and are thus simple in construction compared with a case where the bulging portions are provided inside the padding material, resulting in simple assembly and manufacturing.

The seat for a two-wheeled vehicle includes a front seat and a rear seat, where, if the lumbar support portion is provided between the front seat and the rear seat, preferably, the lumbar support portion and a seating portion of the rear seat are integrally formed by covering padding materials in a form of a single cluster by using a single sheet of a skin.

If this configuration is provided, the lumbar support portion connected to the seating portion of the rear seat at a center portion is integrally formed by using the padding material, a support plate (such as a bottom panel) of a conventional lumbar support portion is no longer necessary, the structure is simple, and assembly and manufacturing are easy.

Moreover, both end sides of the lumbar support portion are preferably formed to be separated from a seat surface.

If this configuration is provided, both end sides of the lumbar support portion are separated from the seat surface, the separated portions are not restricted by the seat surface, the bulging portions can be bulged, and a feeling of seating adapted to the physique of the occupant can be more assuredly increased. Moreover, both end sides of the lumbar support portion are separated from the seat surface, and both end sides can thus be flexed, resulting in an increase in the ability to get it on or off.

Further, cut portions are preferably provided between bottom sides of both sides of the lumbar support portions and a seat portion on which an occupant seats.

As described above, the cut portions can increase the degree of freedom for both sides of the lumbar support portion more than only the separation, resulting in a further increase in the seating feeling adapted to the physique of the occupant. Moreover, the cuts enable both end portions to further flex, resulting in an increase in the ability to get it on or off.

In an embodiment, the cut portion preferably has a round shape without an edge.

The round shape without an edge can prevent the skin from being worn to break due to the flex caused by the presence of the cut portions. Particularly, if the skin is formed as one sheet, even a partial damage can influence the entire seat, and the risk of the influence can thus be reduced.

Moreover, an airbag is used as the bulging portion. The use of the airbag in this way reduces the weight, and facilitates setting of an extent and an amount of the bulge by adjusting an amount of air to be supplied.

Then, the airbag is preferably provided above a bottom plate, and between the skin and the padding material to be in contact with the padding material. The arrangement of the airbag does not directly relate to the bottom plate in this way, the arrangement can thus be easily carried out without moving the bottom plate, and the structure is prevented from becoming complex.

Further, the lumbar support portion and a portion in front of the lumbar support portion are preferably formed by dividing a padding material, and a tube connected to the airbag preferably passes through a dividing portion of the padding material.

The tube passes through the dividing portion of the padding material in this way, and the tube thus does not come in contact with a seated person, which prevents a sense of discomfort.

Moreover, a recessed portion is preferably formed on the padding material of the lumbar support portion in contact with the portion in front of the lumbar support portion so that the tube is engaged with the recessed portion.

If a configuration is provided such that the recessed portion is formed on the padding material, and the tube is engaged with the recessed portion is provided in this way, the tube can be fit into the recessed portion for guiding, resulting in easy assembly. And, with the tube positioned in the recessed portion, it not come in contact with the seated person, and can thus prevent a sense of discomfort.

Moreover, there is preferably provided such a configuration that an operation part for operating the bulging portion is provided in a chassis front position range enabling the operation in a seated state.

This configuration enables an operation of an operation switch, which is the operation part, while the occupant is seated, and particularly, the operation is enabled without requiring a forward-bent posture, and the seat can thus be fit to the physique of the occupant in the state of the seated posture.

Further, there is preferably provided such a configuration that the chassis front position range enabling the operation in the seated state is a range of a handle which the little finger or the ring finger touches.

This configuration enables the occupant to operate the operation switch, which is the operation part, while the occupant is seated, and particularly, the operation is enabled without requiring a forward-bent posture, and by way of only a motion of the little finger or the ring finger while holding the handle, and the operation can be carried out without visually observing an operation switch or the like.

According to embodiments disclosed herein, a support, such as the bottom plate is not necessary, a rearward deformation can be reduced, and the surface sides directly bulge compared with the case where a bulging portion is formed in the padding material, thereby directly supporting the occupant, and can thus produce the sufficient sense of fit adapted to the physique. Moreover, the bulging portions are constructed on the surface side, and are thus simple in construction compared with a case where the bulging portions are provided inside the padding material, resulting in simple assembly and manufacturing.

According to various embodiments, the support plate of the conventional lumbar support portion is no longer necessary, and the structure is simple, and is easily assembled and manufactured.

According to various embodiments, the separated portions are not restricted by the seat surface, the bulging portions can be bulged, and the feeling of seating adapted to the physique of the occupant can be more assuredly increased. Moreover, both end sides of the lumbar support portion are separated from the seat surface, both end sides can be flexed, resulting in an increase in the ability to get it on or off.

According to various embodiments, the cut portions can increase the degree of freedom for both sides of the lumbar support portion, resulting in a further increase in the seating feeling adapted to the physique of occupant. Moreover, the cuts enable both end portions to further flex, resulting in an increase in the ability to get it on or off.

According to various embodiments, the skin can be prevented from being worn to break due to the flex caused by the presence of the cut portions. Particularly, if the skin is formed as one sheet, even a partial damage can influence the entire seat, and the risk of the influence can thus be reduced.

According to various embodiments, the use of the airbag reduces the weight, and facilitates setting of an extent and an amount of the bulge by adjusting the amount of air to be supplied.

According to various embodiments, the airbag is provided above a bottom plate, and between the skin and the padding material to be in contact with the padding material, the arrangement of the airbag does not directly relate to the bottom plate in this way, the arrangement can be easily carried out without moving the bottom plate, and the structure is prevented from becoming complex.

According to various embodiments, the tube passes through the dividing portion of the padding material, and the tube thus does not come in contact with a seated person, which prevents the sense of discomfort.

According to various embodiments, the tube can be guided by using the recessed portion, resulting in easy assembly, and the tube is positioned in the recessed portion, does not come in contact with the seated person, and can thus prevent the sense of discomfort.

According to various embodiments, this configuration enables an operation of an operation switch, which is the operation part, while the occupant is seated, and particularly, the operation is enabled without requiring a forward-bent posture, and the seat can thus be fit to the physique of the occupant in the state of the seated posture.

According to various embodiments, the occupant can operate the operation switch, which is the operation part, while the occupant is seated, and particularly, the operation is enabled without requiring a forward-bent posture, and by way of only the motion of the little finger or the ring finger while holding the handle, and the operation can be carried out without visually observing an operation switch or the like.

DETAILED DESCRIPTION

A description will now be given of embodiments of the present invention referring to drawings. It should be noted that members, arrangements, and the like described below do not limit the present invention, and can be modified in various ways within the purport of the present invention. Moreover, though a description is given of an example of a tandem seat (double seat) provided with a front seat and a rear seat in the following embodiments, it should be noted that the embodiment can be applied to a single seat provided with a lumbar support portion in an embodiment of the present invention.

The Figures show the seat for a two-wheeled vehicle according to an embodiment of the present invention.

The seat for a two-wheeled vehicle S disclosed in this embodiment is constructed by placing padding materials (cushion materials) K on a bottom plate P, covering them with a skin H, and includes a front seat Sf and a rear seat Sr. Then, a lumbar support portion 10 is provided between the front seat Sf and the rear seat Sr. Moreover, a backrest 20 is provided at a rear portion of the rear seat Sr according to this embodiment. A urethane material is used for the padding materials (cushion materials) K according to this embodiment, and the urethane material is also used respectively for padding materials for a seating portion of the front seat Sf, the lumbar support portion 10, and the backrest of the rear seat.

The padding materials K according to this embodiment are constructed individually by a padding material K2 for the front seat Sf, a padding material K1 for the lumbar support portion 10 and the rear seat Sr, and a padding material K3 for the backrest 20 of the rear seat Sr. Thus, the padding material K1 for the lumbar support portion 10 and the padding material K2 for a portion in front of the lumbar support portion 10 are formed by dividing the padding materials K.

Figure 7:
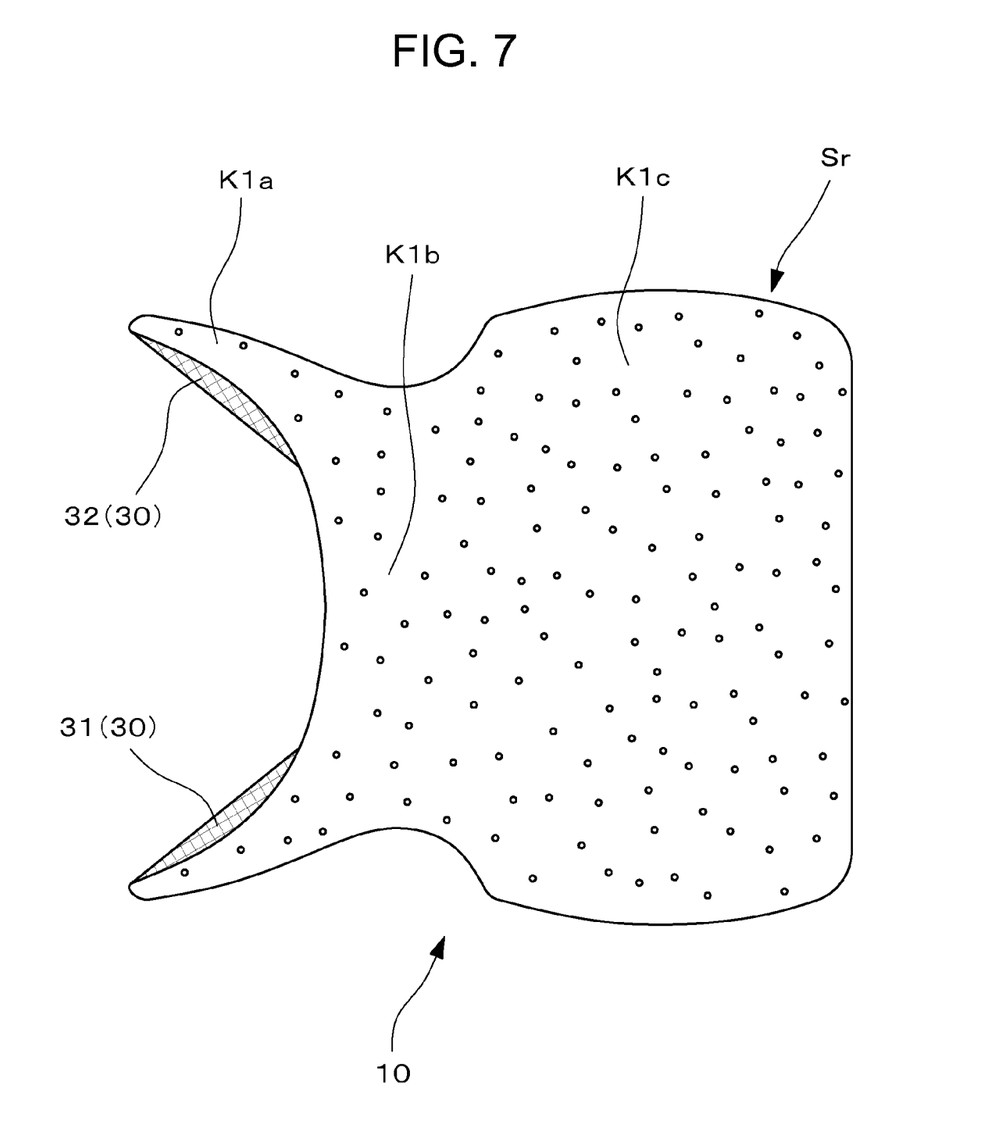
FIG. 7 is a cross sectional view of a major part of a padding and a bulging portion of the lumbar support portion taken along the line A-A of FIG. 6.

The padding material K1 for the lumbar support portion 10 is formed as the padding material K in a single cluster integral with a portion constructing a seating portion of the rear seat Sr as shown in FIG. 7. In other words, front portions K1$a$ in an arc shape protruding forward on both sides, a support portion K1$b$ formed to continue to the front portions K1$a$, and to rise high at a center portion, and a rear portion K1$c$ extending downward on a chassis side from the support portion K1$b$ for seating for the rear seat Sr are integrally formed. Then, a groove portion 15 is formed in the rear portion K1$c$. The groove portion 15 is formed to facilitate a joint of the pad K1 to the bottom plate P.

Moreover, a groove portion 14 is formed at a position in front of a seating surface in the padding material K2 for the front seat Sf. The groove portion 14 is formed to facilitate a joint of the pad K2 to the bottom plate P.

As described above, the pads K1 and K2 are separated from each other, a tube C connected to airbags 31 and 32 described later passes through a dividing portion of the padding materials K to prevent the tube C from directly coming in contact with a seated person, and the seated person is prevented from feeling a sense of discomfort generated by the seated person coming contact with the tube C.

The skin H according to this embodiment is configured to cover the front seat Sf, the lumbar support portion 10, and the rear seat Sr together, and the skin H is formed into a single sheet to have a predetermined shape adapted to an exterior design. The single sheet of the skin H may be constructed by suture sewing multiple skin materials into the single skin H in a predetermined shape. The single sheet of the skin H covers the respective divided padding materials K.

Figure 1:
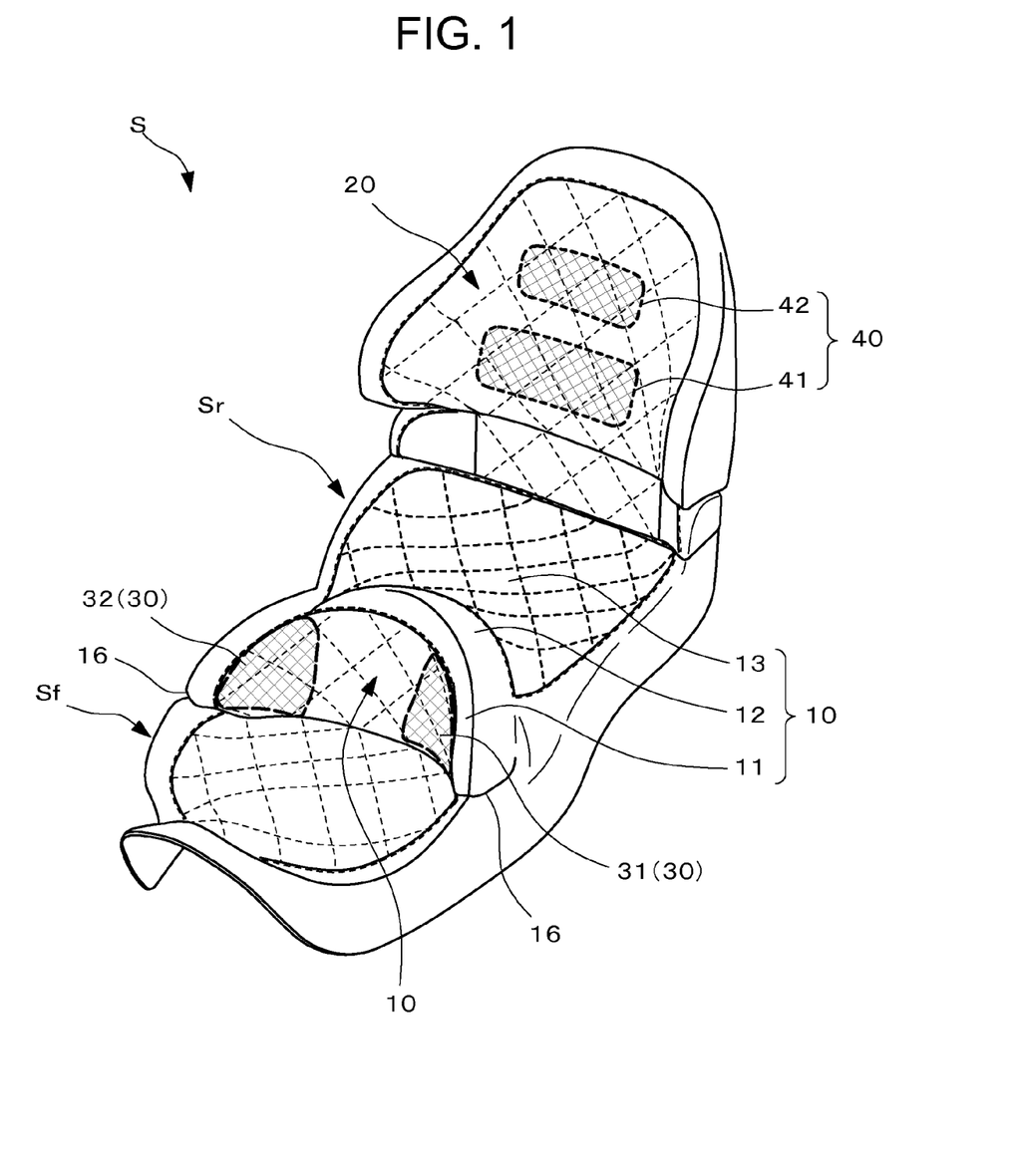
FIG. 1 is a perspective view of a seat for a two-wheeled vehicle according to an embodiment of the present invention.
Figure 2:
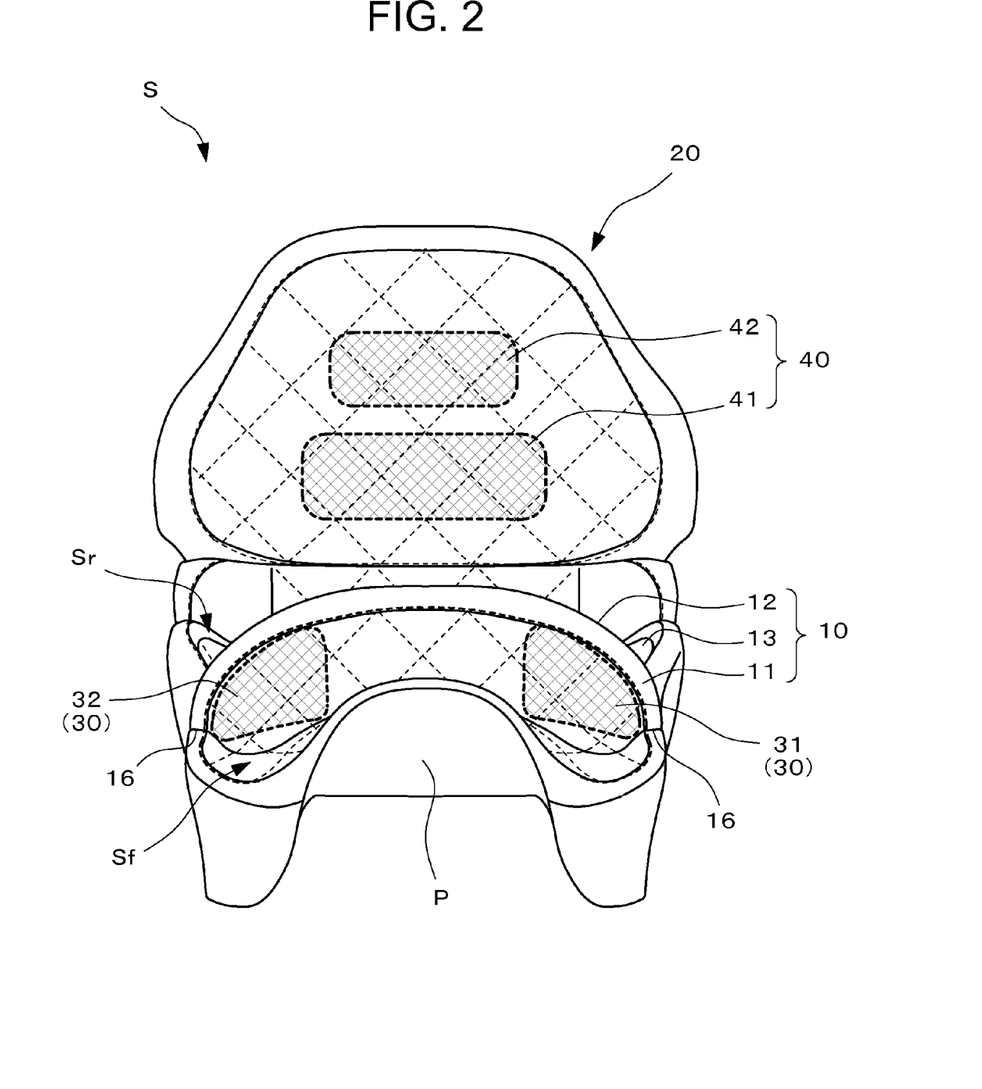
FIG. 2 is a front view of the seat for a two-wheeled vehicle according to an embodiment of the present invention.
Figure 3:
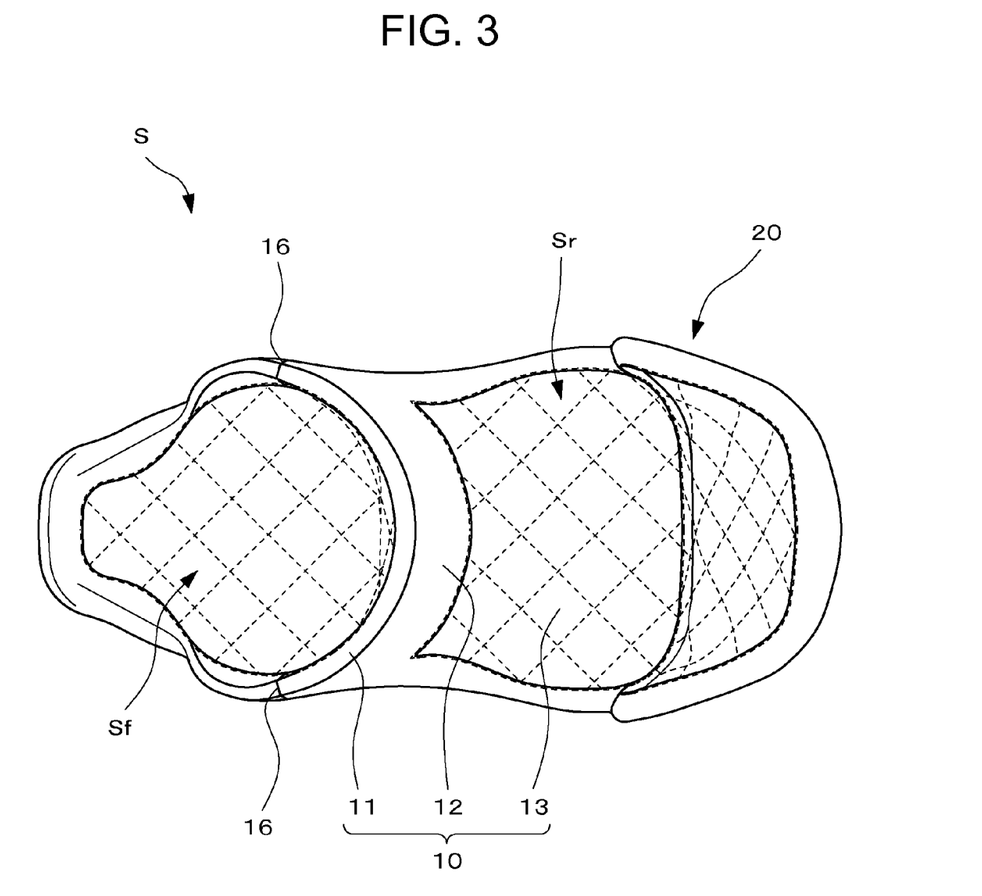
FIG. 3 is a plan view of the seat for a two-wheeled vehicle according to an embodiment of the present invention.
Figure 4:
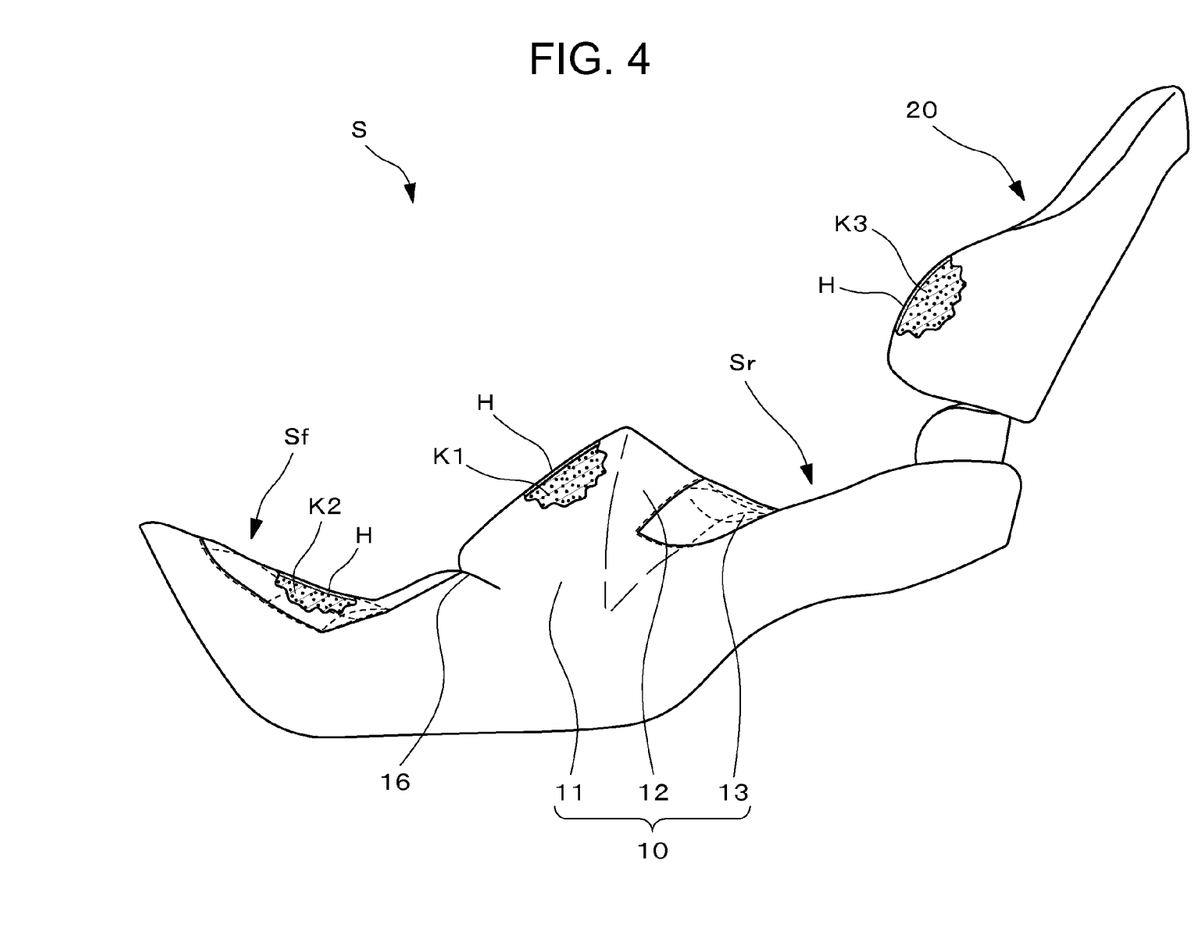
FIG. 4 is a side view of the seat for a two-wheeled vehicle according to an embodiment of the present invention.

The lumbar support portion 10 according to this embodiment is formed by front portions 11 in an arc shape protruding forward on both sides of the lumbar support portion 10, a support portion 12 formed to continue to the front portions 11, and to rise high at a center portion, and a rear portion 13 extending downward on the chassis side from the support portion 12 for seating for the rear seat Sr integrated into a single body as shown in FIGS. 1 and 7.

Then, the lumbar support portion 10 having both sides 11 protruding forward resulting in the arc shape is integrally formed by covering the internal padding materials K1 (K1$a$, K1$b$, and K1$c$) with the skin H.

As described above, the lumbar support portion 10 is constructed by covering the padding material K1 formed in the single cluster corresponding to the lumbar support portion 10 and the seating portion of the rear seat Sr with the skin H, the padding materials K formed into the single cluster are integrated by covering with the single skin H, and even if a support plate, a bottom plate, and the like, are not arranged for the lumbar support portion 10, the lumbar support portion is formed to maintain sufficient strength for supporting the lumbar of the occupant.

Then, bulging portions 30 are formed by surface sides of areas of the front portions 11 bulging forward of the vehicle on both side regions including the front portions 11 which are both sides of the lumbar support portion 10. Then, the front portions 11 which are both sides of the lumbar support portion 10 are formed to be separated from a seat surface. The separation is formed as cut portions 16 between bottom sides of the front portions 11, which are both sides of the lumbar support portion 10, and the seat portion on which the occupant seats.

The cut portions 16 are the padding materials K1$c$ for the front portions 11, which are both sides of the lumbar support portion 10, formed into a round shape without an edge, and the padding materials K1$c$ on both sides in this shape are covered with the skin H to be formed into the round state without an edge.

The airbags 31 and 32 are used as the bulging portions 30 according to this embodiment, the airbags 31 and 32 are arranged to be in direct contact with the padding materials K1$c$, and to be positioned between the padding materials K1$c$ and the skin H. In other words, the airbags 31 and 32 are provided above the bottom plate P between the skin H and the padding materials K1$c$ in contact with the surface of the padding materials K1$c$. Thus, the arrangement of the airbags 31 and 32 does not directly relate to the bottom plate P, the arrangement can be easily carried out without moving the portion of the bottom plate P, and the structure is prevented from becoming complex. Though the airbags 31 and 32 are arranged directly between the padding materials K1$c$ and the skin H, an adhesive material may be used between the padding materials K1$c$ and the airbags 31 and 32.

Figure 6:
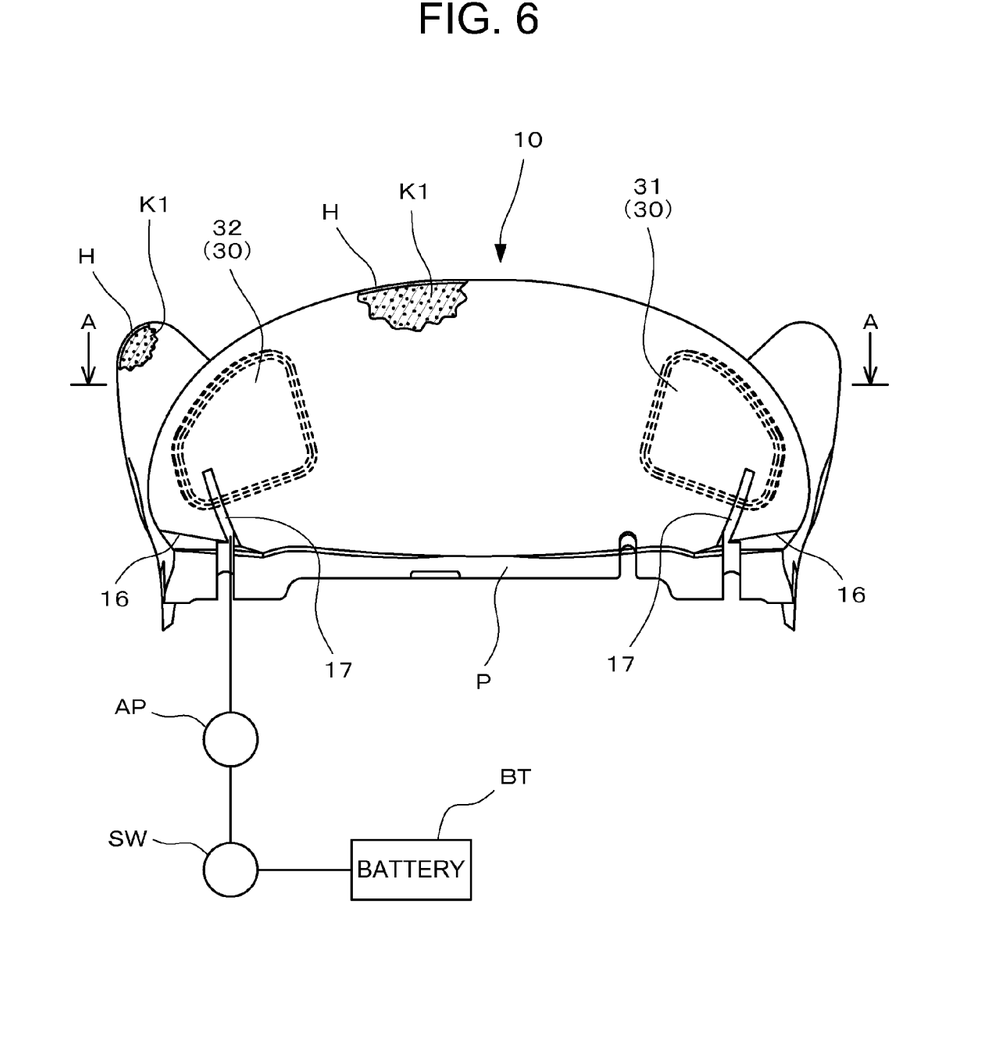
FIG. 6 is a front view of a lumbar support portion.

Moreover, ends on one side of the tube C are connected at predetermined positions of the airbags 31 and 32, at entrances to insides of the airbags 31 and 32 from the downside as shown in FIG. 6 according to this embodiment. The tube C serves for charge and discharge of the air, and an air pump AP is arranged at an end on the other side of the tube C. The air pump AP is configured to be activated by a supply of electricity from a battery BT arranged on a two-wheeled vehicle main body via an operation switch SW serving as an operation part. The air pump AP and the battery BT are properly arranged on the chassis side. Though only a system from the air pump AP to the one airbag 31 is shown in FIG. 6, there is provided such a configuration that two supply openings for the air are provided on the air pump AP, and the air is also supplied from the air pump AP to the airbag 32.

The air pump AP according to this embodiment is configured to forcefully supply and discharge the air depending on a rotational direction of an impeller of the pump. However, there may be provided such a configuration that the air pump AP only supplies the air, and the air in the airbags 31 and 32 are discharged by releasing valves of the air pump AP. Moreover, there can be provided such a configuration that the two air supply openings provided on the air pump AP are switched by selector valves (not shown) on the air pump AP to charge/discharge air individually to/from the airbags 31 and 32, and there can be provided such a configuration that a switching operation on the selector valves is carried out by the operation switch SW.

Figure 8:
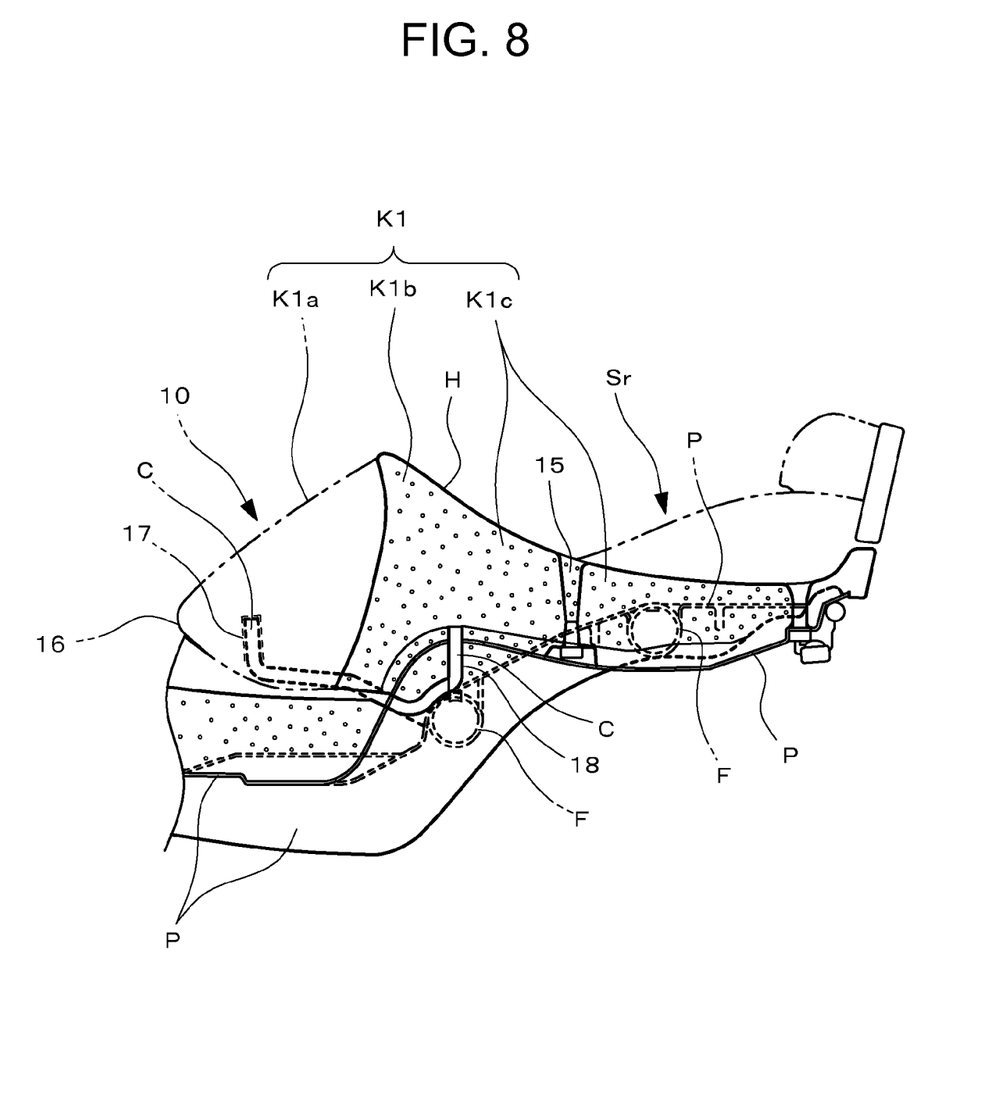
FIG. 8 is a side view explanatory diagram showing an arrangement of a tube of the lumbar support portion.

There is provided such a configuration that a recessed portion 17 and a recessed portion 18 are formed on the padding material K1 which is the place for arranging the tube C as shown in FIGS. 6 and 8, and the tube C is placed in the recessed portions 17 and 18 of the padding material K1 so that the tube C does not directly come in contact with the seated person.

Moreover, the padding material K1 forming the lumbar support portion 10 and the padding material K2 of the portion in front of the padding material K1 are formed by dividing the padding material as shown in FIG. 8, and the tube C connected to the airbags 31 and 32 pass through the dividing portion between the padding material K1 and the padding material K2. Then, the recessed portion 18 is formed in the padding material of the lumbar support portion 10 in contact with the portion in front of the lumbar support portion 10 so that the tube C engages with the recessed portion 18.

The operation switch SW serving as the operation part is provided in a range of a front position of the chassis on the seat operable in a seated state. Examples of the arrangement positions of the operation part include a position closer to the occupant than the handle and a position at the handle. The position is preferably in a range where the occupant can operate the switch serving as the operation part while the occupant maintains the posture supported by the lumbar support portion such as a predetermined position on a fuel tank (including dummy tank) between the seat for a two-wheeled vehicle and the handle.

Further, the operation switch SW serving as the operation part is arranged in a range where the little finger or the ring finger can reach an operation handle as the range of the chassis front position enabling the operation in the seated state. As a result, the operation can be carried out arbitrarily by the little finger or the ring finger during a normal riding operation. Regarding this operation, if a switch in a range where the little finger or the ring finger can reach the switch on the handle on the right side is used for the operation of charging the air, and a switch in a range where the little finger or the ring finger can reach the switch on the handle on the left side is used for the operation of discharging (releasing) the air, the operation switches can be easily operated during the riding without visually observing. In this way, the operation part is preferably at the position enabling the adjustment in a seated state.

A description is now given of airbags provided in the backrest of the rear seat.

Figure 5:
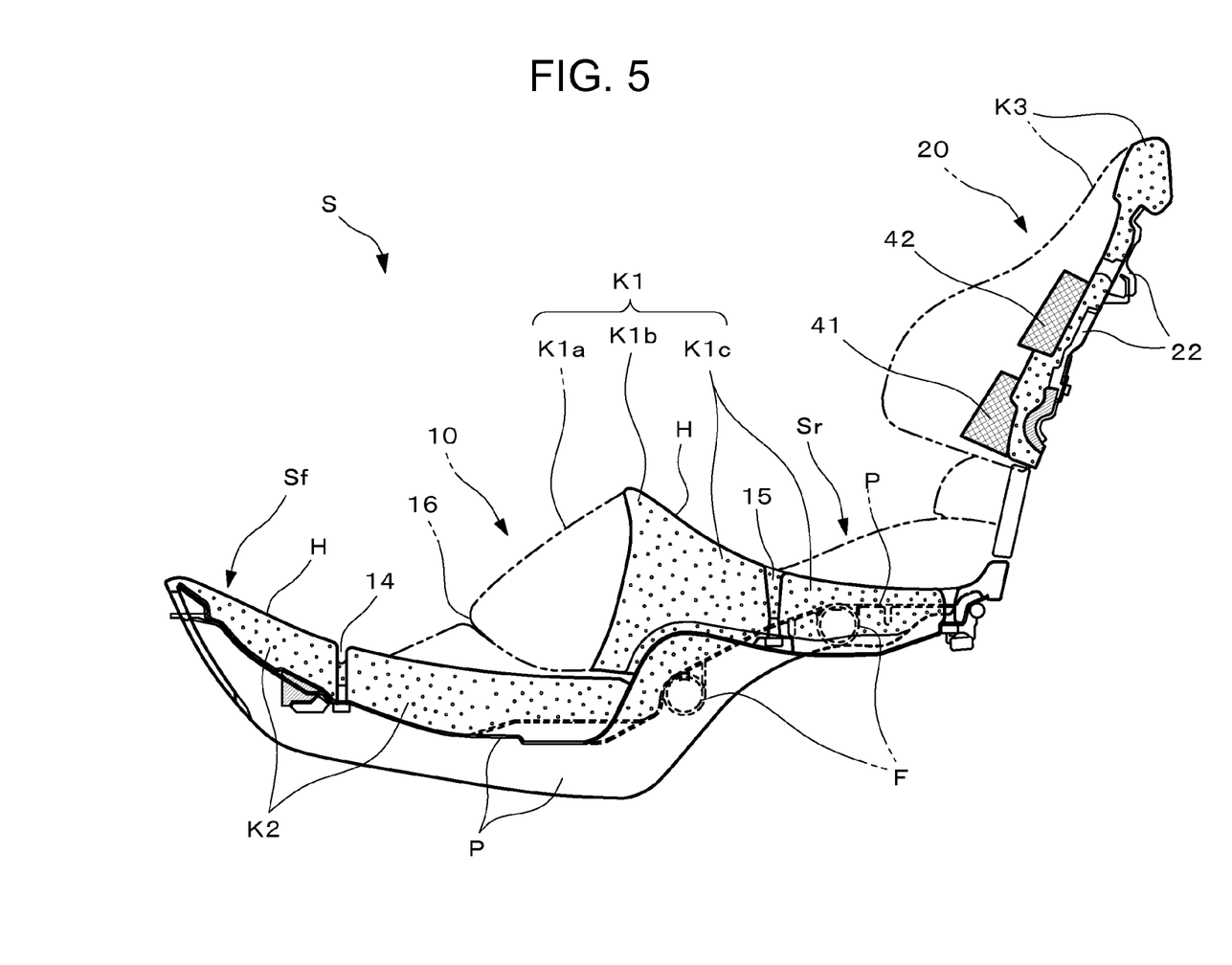
FIG. 5 is a cross sectional view of the seat for a two-wheeled vehicle according to an embodiment of the present invention.

The backrest 20 according to this embodiment is attached to a wall on a seat side constructing a lid body 51 on a luggage box 50 side via known fixing elements. In other words, the padding material K3 is supported by a support portion 22 in the backrest 20 as shown in FIG. 5, and at least two (two according to this embodiment) airbags 40 (41 and 42) are provided in a separated manner in a vertical direction on the padding material K3 in the backrest 20 as shown in FIGS. 1, 9, and 10.

Regarding the airbags 40 according to this embodiment, the airbags 40 (41 and 42) are arranged between the skin H and the padding material K3 as the airbag 30 used for the lumbar support portion 10, and the respective airbags 41 and 42 are arranged to be directly in contact with the padding material K3. The respective airbags 41 and 42 are arranged as the embodiment described before.

The airbag 41 is larger than the airbag 42 according to this embodiment. As a result, the airbag 41 located at a lower part of the lumbar is larger than the airbag 42 located at an upper part of the lumbar, resulting in more comfortable support for the lumbar.

Figure 9:
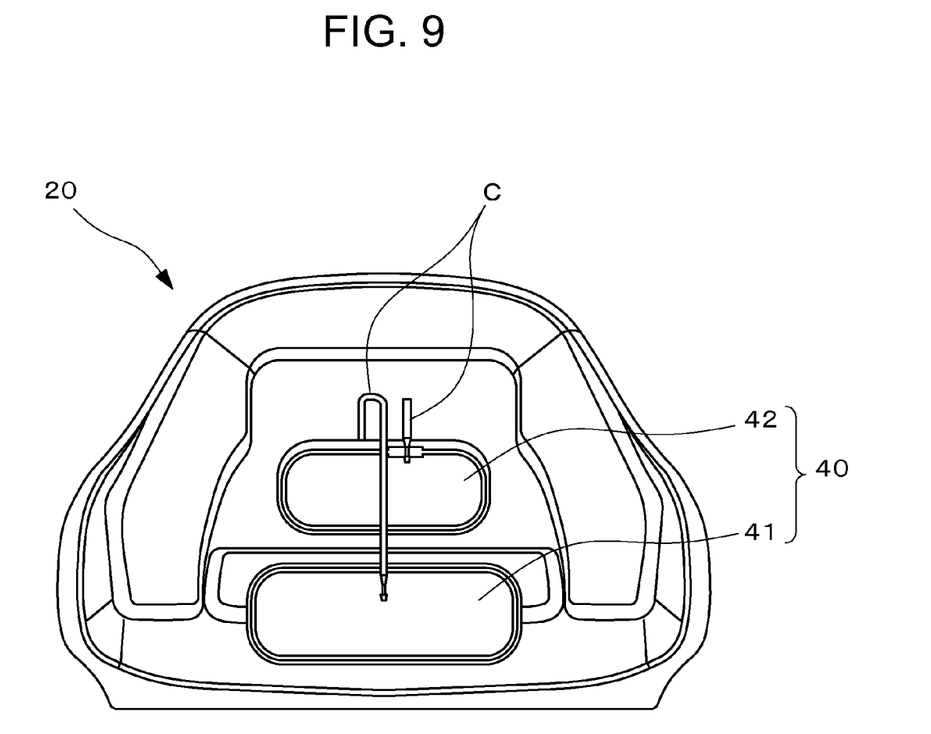
FIG. 9 is a front view explanatory diagram showing an arrangement of the tube of the lumbar support portion on the rear seat side.
Figure 10:
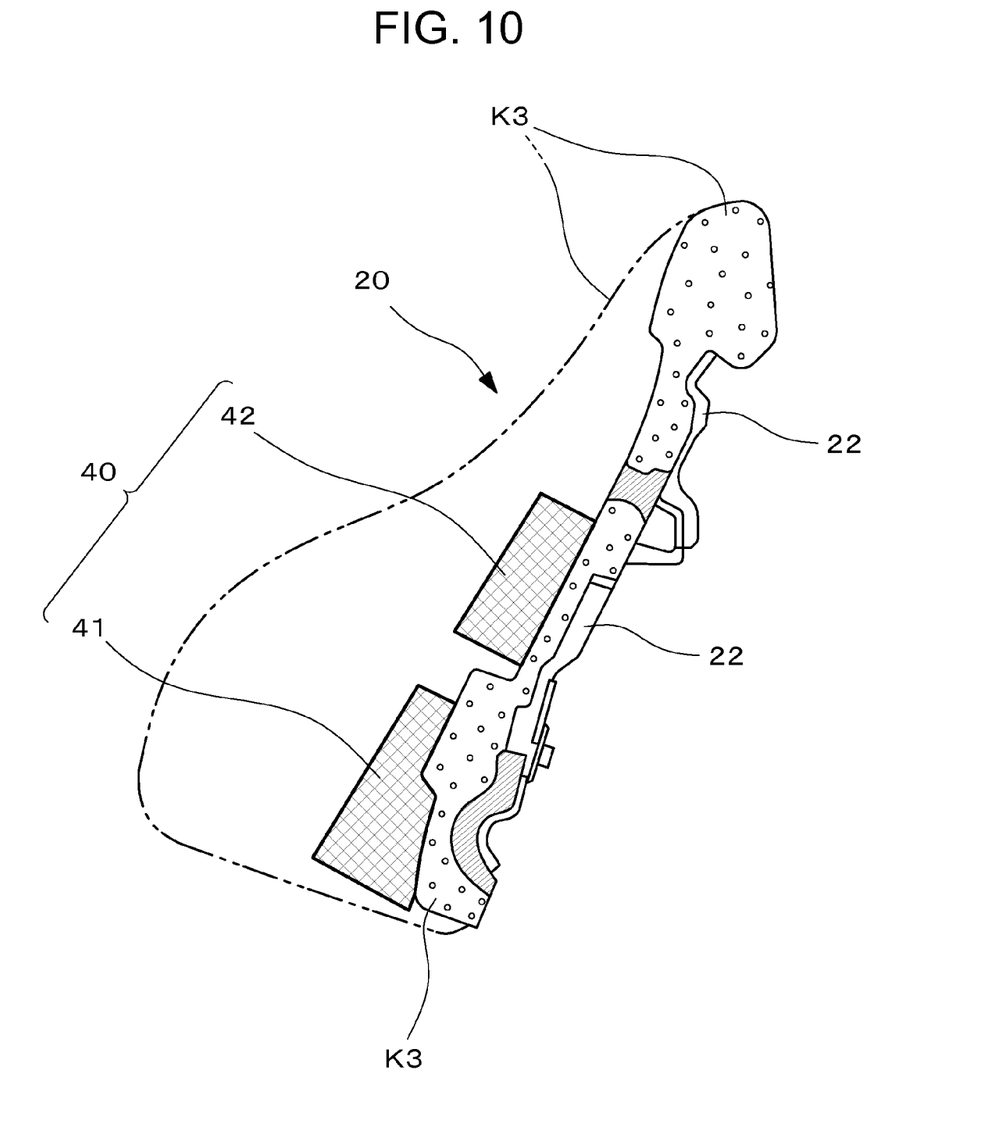
FIG. 10 is a side view explanatory cross sectional view of a major part of a bulging portion on the rear seat side.

Moreover, the tube C is independently connected to the respective airbags 41 and 42 as shown in FIG. 9, and the tube C is arranged between the cushion K3 constructing the backrest 20 and the support portion 22 for supporting the cushion K3, or between the support portion 22 and the wall of the luggage box 50.

Then, a sequence of charging the air from the tube C is changed or the charge and the discharge are alternately carried out, thereby changing bulged amounts to move an upper part and a lower part alternately, resulting in production of a massage effect.

An air pump, a battery, and an operation switch serving as an operation part are provided also according to this embodiment as in the embodiment described before.

If the operation switch (not shown) serving as the operation part on the rear seat Sr side is arranged at a position behind a side of the occupant seated on the rear seat Sr, the operation switch promotes the operation by the occupant on the rear seat Sr, and does not influence an open/close operation of the lid body 51 of the luggage box 50 behind.

Figure 11:
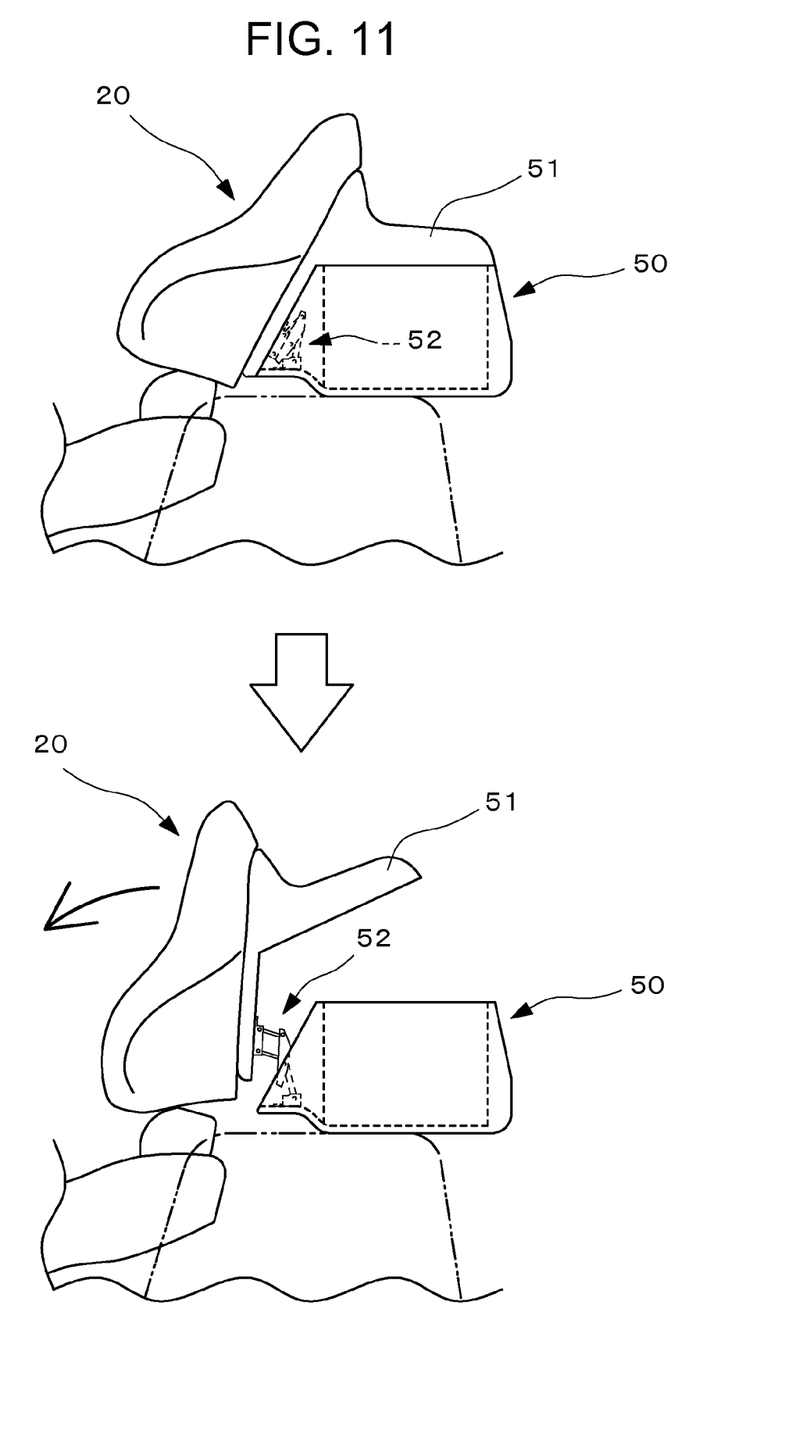
FIG. 11 is a side view explanatory diagram showing a relationship between the lumbar support portion on the rear seat side and a luggage box.

FIG. 11 is an explanatory diagram showing a relationship between the backrest 20 on the rear seat Sr side and the luggage box 50, the backrest 20 on the rear seat Sr is fixed to the luggage box 50 side, and can move along with the lid body 51 of the luggage box 50 according to this embodiment. In other words, there is provided such a configuration that, when the lid body 51 of the luggage box 50 is opened, the backrest 20 falls forward, resulting in such a configuration that the lid body 51 smoothly opens/closes.

A turn of the lid body 51 of the luggage box 50 is constructed by connecting a turn mechanism 52 such as a hinge to a lower portion of the lid body 51 and a lower portion of the backrest 20. Then, there is provided such a configuration that the turn is carried out about a rotational shaft of the hinge, which is the turn mechanism 52. A known link type hinge (various hinges including a double-link type) may be used as the hinge.

A description will now be given of assembly of the seat for a two-wheeled vehicle S having the configuration described above.

First, the padding materials K (K1, K2, and K3) are arranged on the skin H configured as the one sheet. The skin H having a complex shape according to this embodiment has a sequence of assembling the padding materials K, and the padding materials K are divided into at least two parts including the padding material K2 for constructing the front seat Sf, and the padding material K2 for constructing the lumbar support portion 10 and the rear seat Sr. In other words, though the skin H is one unit, the padding materials K is constructed by at least two components. It should be noted that the padding material K1 constructing the lumbar support portion 10 and the rear seat Sr is uniformly formed into one cluster according to this embodiment.

Then, the padding material K2 constructing the front seat Sf and the padding material K1 constructing the lumbar support portion 10 and the rear seat Sr are arranged in the skin H. The arrangement is carried out by first arranging the padding material K2 constructing the front seat Sf on the skin H, and then arranging the padding material K3 constructing the lumbar support portion 10 and the rear seat Sr according to this embodiment. On this occasion, the airbags 31 and 32 serving as the bulging portions 30 are arranged on both side regions including both sides of the lumbar support portion 10. The tube C is connected to the airbags 31 and 32 as described before, and the tube C is arranged in the groove portion 17 and the recessed portion 18.

Then, the bottom plate (bottom panel) P for supporting the padding materials K is arranged, a terminal treatment is carried out for the skin H at a terminal portion of the bottom plate P, thereby constructing the seat for a two-wheeled vehicle by arranging the padding materials K on the bottom plate P, and covering them with the skin H.

In this embodiment, the terminal treatment for the bottom plate P and the skin H is carried out by known means, and the terminal of the skin is fixed by way of tucker to push staples into a terminal portion on the rear side (chassis side) of the bottom plate P according to this embodiment.

REFERENCE SIGNS LIST

C: tube
H: skin
K, K1, K2, and K3: padding material (cushion material)
K1a: front portion
K1b: support portion
K1c: rear portion
P: bottom plate
S: seat for a two-wheeled vehicle
Sf: front seat
Sr: rear seat
10: lumbar support portion
11: front portion
12: support portion
13: rear portion
14, 15: groove portion
16: cut portion
17: groove portion
18: recessed portion
20: backrest
22: support portion
30, 31, 32, 40, 41, and 42: bulging portion (airbag)
AP: air pump
SW: operation part (operation switch)
BT: battery
50: luggage box
51: lid body
52: turn mechanism (hinge)

The invention claimed is:

1. A seat for a two-wheeled vehicle comprising:
   a front seat;
   a rear seat; and
   a lumbar support portion provided between the front seat and the rear seat,
   wherein:
   the lumbar support portion is formed into an arc shape having a left side and a right side, from a seated passenger perspective, and which together constitute both sides of the lumbar support portion, with both sides protruding forward;
   the lumbar support portion includes an internal padding material formed continuously;
   bulging portions having surface sides of left and right side regions that together constitute both side regions including said both sides of the lumbar support portion bulging in a forward direction of the vehicle are formed on said both side regions;
   the front seat, the lumbar support portion and the rear seat are integrally covered with a single sheet of a skin;
   ends of both sides of the lumbar support portion are formed to be separated from a seat surface of the front seat; and
   cut portions are provided in the skin between bottom sides of said both sides of the lumbar support portion and a seat portion of the front seat on which the seated passenger sits.

2. The seat for a two-wheeled vehicle according to claim 1, wherein
   the lumbar support portion and a seating portion of the rear seat are integrally formed by padding materials in a form of a single cluster.

3. The seat for a two-wheeled vehicle according to claim 1, wherein the cut portion has a round shape without an edge.

4. The seat for a two-wheeled vehicle according to claim 1, wherein an airbag is used as the bulging portions.

5. The seat for a two-wheeled vehicle according to claim 4, wherein the airbag is provided above a bottom plate, and between the skin and the padding material to be in contact with the padding material.

6. The seat for a two-wheeled vehicle according to claim 4, wherein:
   the lumbar support portion and a portion in front of the lumbar support portion are formed by dividing a padding material; and
   a tube connected to the airbag passes through a dividing portion of the padding material.

7. The seat for a two-wheeled vehicle according to claim 6, wherein a recessed portion is formed on the padding material of the lumbar support portion in contact with the portion in front of the lumbar support portion so that the tube is engaged with the recessed portion.

8. The seat for a two-wheeled vehicle according to claim 1, wherein an operation part for operating the bulging portions is provided in an operating position range, defined as a chassis front portion of a vehicle body that enables the seated passenger to operate the operation part.

9. The seat for a two-wheeled vehicle according to claim 8, wherein the operating position range is a range of a handle which is touchable by a little finger or a ring finger.

* * * * *